Aug. 30, 1932.　　　　H. SOULE　　　　1,875,274

SNAP HOOK

Filed April 4, 1932

INVENTOR:
Henry Soule
BY David E. Carlsen
ATTORNEY.

Patented Aug. 30, 1932

1,875,274

UNITED STATES PATENT OFFICE

HENRY SOULE, OF DWIGHT, NORTH DAKOTA

SNAP HOOK

Application filed April 4, 1932. Serial No. 602,954.

My invention relates to an improved snap hook for rope ends or so called traces and is particularly useful for tethering ropes though its usefulness is not limited to only such uses. This device further comprises certain improvements over my patented snap hook United States Patent Number 1,744,419 issued January 21, 1930, said patented device involving a rope end holding device used in conjunction with a snap hook of certain structure, said holder being used integrally with this present new and improved hook hereinafter described.

In the accompanying drawing,—

Figure 1:
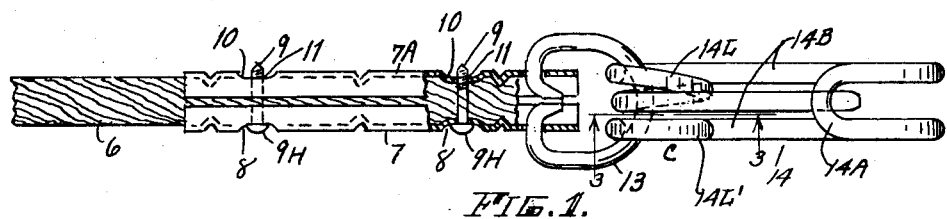
Fig. 1 is a top view of the improved snap hook connected with a rope holder in the preferred embodiment of my invention.

Referring to the drawing by reference numerals 6 designates a rope as used for tethering cattle, etc., in stalls or afield. 7—7A are two elongated metal shell pieces of approximately semi-cylindrical form, said shells being counterparts except that one of them as 7 has a number of apertures around which the metal is countersunk as 8 to allow a countersunk screw head to be retained therein, as the head 9H of screw 9 (See Fig. 1 particularly). The other shell section as 7A, has a slightly flattened area 10 diametrically opposite each countersunk 8 in which is a threaded aperture 11 to be engaged by the threads of screw 9.

12 is a pair of diametrically opposite apertures near the front ends of the shell pieces and engaged pivotally by a metal ring 13 which is in turn engaged pivotally by the inner end of my improved snap hook which will now be described.

Figure 2:
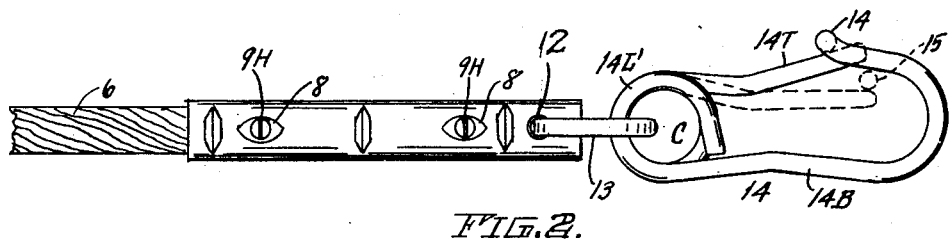
Fig. 2 is a side elevation of Fig. 1
Figure 3:
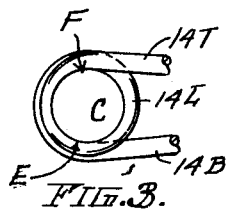
Fig. 3 is an enlarged detail view mainly of a center coil of the snap hook about as on line 3—3 in Fig. 1.

The snap hook comprises a single integral piece of heavy wire 14 formed from front to rear as follows: The front end of the snap hook comprises the usual rearwardly open hook formed by bending the wire in a U-shape at the terminus of the hook, as 14A, thence the wire extends in the sweeping curve downward and thence rearwardly in two parallel bights designated 14B to a coil formation at the rear end of the hook designated as C, said coil means loosely engaging the ring 13. Said coil means comprise a common ring integral of the main hook. One bight 14B of the hook, as the upper one in Fig. 1, is coiled at the rear in one and a quarter loop 14L in upright plane, and from the latter or inner part of said coil the wire is extended forward and upward to provide a tongue or prong 14T adapted to be sprung into engagement with the U-shaped forward terminus of the hook as shown in full lines in Figs. 1 and 2. Said tongue may be pressed inwardly when a bit, ring or other device represented by a circle 15 in Fig. 2 is to be engaged in the hook. The other bight 14B, as the lower one in Fig. 1 is formed at its rear end as a plain circular ring 14L' in upright plane and parallel to the coil of the upper bight above described. The ring 14L' and coil 14L are alined concentrically as best shown in Figs. 2 and 3. In the manufacture of my snap hook a heavy gage wire is desirable and it has been found that such wire, coiled as 14L, creates normally a too strong resistance of the tongue 14T. Therefore in the making of the hook I reduce the metal in that part of the hook which is coiled at 14L by milling or otherwise reducing its size in cross section, as between points designated E and F in Fig. 3.

This reduces the strength of the wire and affects the tongue 14T in such a manner that the latter is more readily pressed down as to the dotted position in Fig. 2 for engaging a bit or other device in the hook. However, the outer coils are not reduced in any manner and take all the pulling strain of the hook or the rope as the case may be.

The improved and simplified snap hook has now been fully described. It is obvious that it should be made of a heavy gage spring wire and said gage determined according to the capacity of hook desired or the use to which such hook is to be put.

I claim:

1. A snap hook of the class described comprising a single integral piece of wire bent in U-shape at its forward terminal, two bights of said wire extending in parallel relation in a curvature from said terminus forwardly and downwardly in a curvature and thence rearwardly to form an open hook, one bight of said wire formed in spaced relation to said hook with a turn and a quarter upright loop, thence extending forward in the form of a tongue toward the U-shaped forward terminus and adapted to frictionally and yieldably engage upwardly therein and the other bight formed at the rear with a plain loop registering horizontally with said coil of the first described bight.

2. The structure specified in claim 1 in which said loop from which the tongue extends is reduced in cross sectional area throughout a predetermined part for the purpose set forth.

In testimony whereof I affix my signature.

HENRY SOULE.